United States Patent [19]

Laarkamp

[11] 3,937,674

[45] Feb. 10, 1976

[54] PREPARATION OF MODIFIED PETROLEUM RESINS

[75] Inventor: Jan Laarkamp, Midden-Beemster, Netherlands

[73] Assignee: Stamicarbon N.V., Geleen, Netherlands

[22] Filed: Sept. 19, 1972

[21] Appl. No.: 290,359

[30] Foreign Application Priority Data
Sept. 24, 1971 Netherlands...................... 7113141

[52] U.S. Cl. ......... 260/19 UA; 106/28; 260/23.7 R; 260/23.7 C; 260/82; 260/93.1
[51] Int. Cl.² ......................................... C08L 91/00
[58] Field of Search ......... 260/93.1, 19 UA, 23.7 C, 260/82, 23.7 R; 106/28

[56] References Cited
UNITED STATES PATENTS

| | | | |
|---|---|---|---|
| 2,762,712 | 9/1956 | Bloch | 106/28 |
| 2,861,966 | 11/1958 | Betts | 260/23.7 C |
| 3,084,147 | 4/1963 | Wilks | 260/93.1 |
| 3,230,162 | 1/1966 | Gilchrist | 260/19 U |

FOREIGN PATENTS OR APPLICATIONS

| | | | |
|---|---|---|---|
| 1,152,509 | 7/1967 | United Kingdom | 260/23.7 R |

OTHER PUBLICATIONS

"Printing Inks," Ellis, 1940, pp. 135, 143, 153.
"Organic Chemistry," Wertheim, p. 247, 1951.

*Primary Examiner*—M. J. Welsh
*Attorney, Agent, or Firm*—Cushman, Darby & Cushman

[57] ABSTRACT

Petroleum resin comprising units of cyclopentadiene, methyl cyclopentadiene or both is reacted at 150°–320°C with an unsaturated fatty acid, such as tall oil fatty acid, in the presence of magnesium oxide or other metal compound for a period of time until a modified resin having a melting point of at least 125°C, preferably 140°–160°C is obtained. The resulting resins are especially useful as binding and thickening agents for printing ink resulting in an ink that dries rapidly and is resistant to rubbing.

28 Claims, No Drawings

PREPARATION OF MODIFIED PETROLEUM RESINS

BACKGROUND OF THE INVENTION

Printing ink mainly consists of a dye, a resin which serves as a binding and thickening agent, and a solvent or a mixture of solvents. The printing-ink resins used are chiefly colophony derivatives. Colophony is a natural product, the supply and price of which are subject to fluctuations. It is therefore important that other sources of printing-ink resins be available.

The object of the present invention is the preparation of a resin that can be used as a printing-ink resin, and, more in particular, a resin that can be used in very rapidly drying rotogravure inks.

A resin of this type will have to meet the following requirements:

a. the solubility in the usual solvents, such as toluene and mixtures of toluene and gasoline having a boiling range of 80°–110°C must be satisfactory. For some applications, even complete solubility in gasoline is desired;

b. a solution with a high content must have a reasonable viscosity, e.g. 100-500 cP for a 50 % toluene solution;

c. the melting point must be reasonably high, preferably 140°C or more;

d. the pigment-wetting must be satisfactory;

e. a resin solution must dry rapidly;

f. the resin layer or ink layer obtained upon drying must be rub-resistant.

A resin that meets the above requirements may also be used in other fields, e.g. in lacquer and varnish, as a refining agent for paper and textiles, as a coating or as an admixture or diluent in other polymers.

DETAILED DESCRIPTION OF THE INVENTION

According to the invention, a resin that is suitable for use as a printing-ink resin can be prepared by reacting a weakly unsaturated petroleum resin substantially composed of units derived from cyclopentadiene and/or methyl cyclopentadiene with an unsaturated fatty acid or a mixture of unsaturated fatty acids from 5–50 % by weight calculated to the petroleum resin at a temperature of 150°–320°C and in the presence of from 0.05 % to 5 % by weight calculated to the petroleum resin of a metal compound that is soluble in the reaction mixture.

The process according to the invention makes it possible to obtain resins that can excellently be incorporated in printing ink to replace the colophony derivatives and the modified phenol resins which are now commonly used in printing ink formulations. The process is simple and the starting materials used are readily available in sufficient quantities at a low price. The properties of the product so obtained are partly dependent on the nature and ratio of the starting materials used and on the reaction conditions employed.

There are a number of disadvantages if certain reaction conditions and parameters are not observed. For instance, the unmodified weakly unsaturated petroleum resins substantially composed of units derived from cyclopentadiene and/or methyl cyclopentadiene by themselves are less suitable for printing resin, one reason being that these resins have too low a viscosity. By weakly unsaturated petroleum resin is meant a resin composed essentially of polymerized units of cyclopentadiene, methyl cyclopentadiene or both having a bromine value of 15 to 150 and preferably 30 to 75 g per 100 gram of unsaturated resin. Normally the petroleum resin contains at least 80 % by weight of cyclopentadiene units, methyl cyclopentadiene units or both. In addition, the resins with melting points of 100°–200°C are too sticky, while the resins with higher melting points are difficult to process and are only slightly soluble in the usual aromatic and aliphatic solvents. Simply mixing the unmodified petroleum resin with unsaturated fatty acids is not suitable either, because the melting point decreases strongly and drying is very poor owing to the presence of the fatty acids. Even when heating a weakly unsaturated petroleum resin with one or more fatty acids in the absence of the metal compound the product obtained is less suitable as a printing resin, mainly because the printing ink prepared with this resin does not dry rapidly.

The process according to the present invention makes it possible to prepare hard resins that meet the requirements demanded of a printing-ink resin and which combine the desirable features of a very high drying rate with a high rubbing resistance of the dried ink. Indeed, due to this combination of properties such modified resins are superior to the known printing-ink resins.

It appears that, in the process according to the present invention, replacement of the weakly unsaturated resin composed of (methyl) cyclopentadiene by a linear aliphatic petroleum resin, consisting, e.g. of units derived from isoprene or butadiene or butene, gives rise to products that are less suitable for use as printing-ink resins hence resins comprising cyclopentadiene and/or methyl cyclopentadiene are used.

The petroleum resin that is used as a starting material is of the type that can be obtained by thermal polymerization of cyclopentadiene and/or methyl cyclopentadiene. A polymerization of this type can be carried out by reacting the monomers or dimers derived therefrom at elevated temperature and pressure, if so desired, as a solution in an inert solvent or as a mixture, with other compounds present in the distilled fractions from the steam cracking process. The thermal polymerization may be carried out at 220°–300°C and a pressure of 10-30 atm. The preparation may be followed, if so desired, by a distillation, with or without steam injection. Preparation of these polymeric materials is described in U.S. Pat. No. 3,084,147 and French Pat. Nos. 1,407,175 and 1,500,162. The disclosure of each of these patents is hereby incorporated by reference.

The melting points of these petroleum resins may range between 70°C and 200°C. Use is preferably made of resins with melting points over 120°C and, in particular, between 140° and 180°C. However, it is also possible to use resins with lower melting points and to subject these resins first to a heat treatment at about 250°–290°C, which leaves a residue with an elevated melting point. Another possibility is to use a resin with a relatively low melting point and to raise the melting point during the modification reaction by the choice of the reaction conditions, as will be described further. The bromine number, expressed as grams of bromine per 100 grams of resin, is nearly always lower than 150 and ranges between 30 and 75 in most cases.

Fatty acids that may be used are monounsaturated or polyunsaturated fatty acids, especially the unsaturated fatty acids with 12-30 carbon atoms. Some examples are oleic acid, linolenic acid, linoleic acid, palmitoleic acid, elaidic acid, ricinoleic acid, petroselic acid, arachidonic acid, and cetoleic acid. The fatty acid need not be essentially free from other fatty acids. In fact mixtures of unsaturated fatty acids may also be used, e.g. those obtained by saponification of drying or semi-drying oils. Owing to the low price and the excellent properties of the modified resin, tall-oil fatty acid, a mixture of mainly oleic acid (45 % by weight) and linoleic acid (48 % by weight), is particularly suitable. If so desired, the fatty acid or mixture of fatty acids used may also contain other organic compounds, provided they do not interfere with the modification reaction and do not detract from the quality of the modified resin, e.g. resin acids, colophony, or esters of unsaturated carboxylic acids.

In general, from 5–50 % by weight of the unsaturated fatty acid calculated on the weight of petroleum resin is used. Preferably the amount is 10–30 % by weight.

The metal compounds that may be used during the reaction are divalent or polyvalent metals that can be dissolved or divided in the reaction mixture, are not strongly colored, and do not produce strongly colored products in combination with the petroleum resin and unsaturated fatty acids. As used herein a metal compound is said to be soluble if it can be divided in the reaction mixture to such an extent that no more solid particles can be observed in the reaction mixture with the unaided eye. Use is preferably made of metal oxides or carboxylic salts of metals. The carboxylic acids from which the metal salt has been derived may be e.g., saturated or unsaturated fatty acids having from 2 to 30 carbon atoms. Some suitable metal compounds are zinc oxide, zinc oleate, aluminum oleate, aluminum oxide, iron oxide, tin oxide, molybdenum oxide, magnesium oxide, magnesium stearate, and magnesium oleate. Thus the oxides or carboxylic salts having from 2 to 30 carbon atoms of a metal selected from zinc, aluminum, iron, tin, molybdenum and magnesium are used. Mixtures of two or more metal ions or two or more oxides, carboxylic salts or both may also be used.

Good results are obtained in particular with the use of compounds of metals from groups IIa, IIb, and IIIa of the Periodic Table. The use of magnesium oxide as the metal compound gives modified petroleum resins that can be processed into extremely rapidly drying solutions and are consequently very suitable for rotogravure printing-ink resin and this application is preferred.

The metal compounds are generally used in amounts of between about 0.05 and about 5 % by weight, calculated on the weight of petroleum resin, and, preferably, in amounts of between 0.1 and 1.0 % by weight.

The modification reaction is generally carried out at a temperature ranging between about 150° and about 325°C, and preferably at a temperature ranging between about 225° and about 275°C and especially between about 240° and about 275°C. Any components that are released from the reaction zone and which are volatile at the reaction temperature may be either removed or condensed and returned to the reaction mixture.

As previously indicated the petroleum resin need not prior to commencing the reaction, have an optimum melting point from 70°–200°C, preferably from 140°–180°C, as higher and lower melting point resins can be used. For instance, if a petroleum resin with a low melting point, e.g. of 70°–120°C, is used as the starting product the reaction is conducted at a higher temperature, preferably at 260°–275°C. It is also possible first to heat a resin with a low melting point for some time at 240°–290°C, in the absence of the other components, until a resin with a higher melting point, e.g. of 140°–180°C, has been obtained, and then to heat the resin together with the fatty acid or mixture of fatty acids and the metal compound.

If a resin with a comparatively high melting point is used, the modification reaction is generally carried out at a temperature ranging between 240° and 260°C. Thus with relatively minor variations in heating conditions a range of resins may be used.

When the fatty acid or mixture of fatty acids is mixed with the petroleum resin and the metal compound, the melting point of the resin strongly decreases. Later during the subsequent heat-treatment the melting point of the product rises slowly. Heating the reaction mixture is preferably continued until a product with a melting point of 125°C or over but generally not exceeding about 180°C, and, preferably, a product with a melting point of 140°–160°C, has been obtained. The reaction time required depends on the starting materials and the reaction conditions and is 2–8 hours in most cases.

The reaction may be conveniently carried out at an atmospheric pressure although superatmospheric pressure may also be used. However, if superatmospheric pressure is used the pressure is usually about 5–30 kg/cm².

To avoid discoloration of the product and formation of undesirable by-products the process is preferably effected in the absence of oxygen, e.g. in a nitrogen or other inert gaseous atmosphere.

The various components may be added together in any order desired. During the reaction, sufficient mixing is ensured so that the reaction mixture remains as homogeneous as possible. This can be achieved by a number of known means including by stirring mechanically or by passing a flow of inert gas through the reaction mixture.

After completion of the modification reaction, the modified resin may be processed further in a known way, e.g. into flakes or into a solution.

The modified petroleum resin obtained by the process according to the invention and printing inks containing such resins sometimes upon storage develop the odor characteristic of higher hydrocarbons. To suppress this odor, a small quantity of an olefinically unsaturated aromatic hydrocarbon, such as styrene, alpha-methylstyrene or vinyltoluene, may be added to the reaction mixture, preferably in an early stage before the reaction mixture which contains the petroleum resin is heated to the reaction temperature. The quantity used may be from 1 to 6 %, preferably from 2.5 to 4.5 % by weight based on the petroleum resin.

The properties of the inks based on a modified petroleum resin according to the invention may be improved further by adding an acrylic resin or acrylic monomers to the reaction mixture in a quantity of from 1 to 10 % by weight based upon the petroleum resin. The acrylic resin may be added at any stage in the preparation of the modified petroleum resins. Preferably acrylic monomers are used, which are added to the reaction mixture in an early stage, before the mixture containing the petroleum resin is brought to the desired reaction temperature. Best results are obtained by using a mixture of acrylic monomers comprising equal quantities of acrylic acid or methacrylic acid and alkyl esters of acrylic acid or methacrylic acid, such as the methyl-, ethyl-, butyl-, hexyl- or octyl esters of acrylic acid or methacrylic acid.

The modified resins prepared by heating the weakly unsaturated petroleum resin with unsaturated fatty acids and a metal compound are, in general, only moderately compatible with other resins that are commonly used in printing ink, such as, e.g., chlorinated rubber and modified phenol resins. Illustrative chlorinated rubbers and phenol resins include chlorinated polyisoprene and a condensation product of phenol and formaldehyde modified with colophony. This compatibility can be improved by using a comparatively high percentage of fatty acids and metal compound during the preparation of the resin, for instance using up to 30 % by weight of fatty acids and 0.9 % by weight of magnesium oxide.

The compatibility can, however, be markedly improved by carrying out the modification reaction in the presence of a phenol, or of a phenol resin, or of compounds capable of producing a phenol resin under the reaction conditions, or of resin acis and related compounds. Also aliphatic and aromatic polycyclic hydrocarbons, such as e.g., naphthalene and decalin, have a favorable effect on the compatibility of the modified resin with other resins e.g. ethylcellulose. It is also possible to use several of the above measures in combination. Of particular importance is a good compatibility with chlorinated rubber since chlorinated rubber is frequently used in the preparation of high-grade rotogravure printing inks.

A modified resin with an enhanced compatibility may particularly be obtained by effecting the modification reaction in the presence of from 5 to 100 %, preferably from 15 % to 45 % by weight based on the petroleum resin used of a phenolic resin. Such a phenolic resin is preferably a phenol-formaldehyde or alkylphenol-formaldehyde resin of the resol- or benzyl-ether type that has been condensed to provide a low degree of condensation. Alternatively such a phenolic resin may be formed in situ by adding a phenol and a folmaldehyde source to the reaction mixture or by pre-reacting a phenol and a formaldehyde source at 100°C – 200°C, if desired in the presence of part of the reaction components such as the unsaturated fatty acid or acids, the metal compound, the resin acids, the acrylic resin or acrylic monomers, followed by addition of the petroleum resin and any other compounds and effecting the modification reaction. Taking into account the temperature used in the modification reaction, the formaldehyde source is preferably paraformaldehyde. If so desired, other aldehydes may be so used, e.g., acetaldehyde or propionaldehyde. The molar ratio between the aldehyde and the phenol is generally between 1 : 1 and 2 : 1. An advantage of the use of a phenol resin is that substantially no gaseous substances escape when the components are heated thus enabling the reaction to be carried out in a vessel that is not eqipped with a condenser or reflux cooler. If use is made of a phenol resin or of a phenol and an aldehyde, the modification reaction may be carried out at atmospheric or superatmospheric pressure at a temperature between 150° and 320°C, preferably between 225° and 257°C.

By using greater quantities of phenolic resin or precursors thereof, for example from 40–75 % by weight based on the petroleum resin, and by using phenolic resins derived from alkylphenols such as butylphenol or octylphenol, the compatibility of the modified petroleum resin with gasoline is enhanced, even approaching complete solubility in gasoline.

If it is desired to prepare a modified resin with an enhanced compatibility, the modification reaction may be carried out in the presence of 1–25 % by weight of a substituted or unsubstituted phenol, calculated on the amount of petroleum resin. Preferably an amount of 4–10 % by weight of a phenol is used. Suitable phenols are unsubstituted or substituted with one or more lower alkyl, lower alkoxy, alkaryl and aralkyl groups. Suitable compounds include phenol, alkyl phenols, alkoxy phenols, alkaryl phenols, aralkyl phenols, bisphenols and the like having from 7–16 total carbon atoms. The temperature at which the modification reaction is effected in the presence of a phenol may again be within the range of the modification reaction, that is from 150°–320°C and preferably from 225°–275°C.

A further possibility of improving the properties of the modified resin as regards the compatibility with chlorinated rubber and other resins is the addition of resin acids to the reaction mixture. As used herein resin acids characterizes the acids, other than fatty acids, that are contained in colophony resins, rosin, and the like. The most important resin acid is abietic acid and other resin acids include neo-abietic acid and laevopimaric acid. The resin acids may be present in the reaction mixture in amounts of between 0.5 and 20 % by weight, calculated on the amount of petroleum resin. Use is preferably made of amounts of 1.5–5 % by weight. It is possible to add pure resin acids to the starting mixture of petroleum resin, fatty acids, and metal compound. Another possibility is to add colophony resin or rosin to the mixture. However, the simplest procedure is that in which the starting materials are not pure unsaturated fatty acids but rather unsaturated fatty acids containing resin acids. For instance, the process may be started from tall-oil fatty acids containing colophony. An advantage is then that these impure fatty acids or mixtures of fatty acids are cheaper than the pure fatty acids.

The modification reaction carried out in the presence of resin acids may also be effected at temperatures of 150°–320°C, and preferably, at a temperature of between 240° and 275°C.

The invention will be elucidated and illustrated by the following examples, but is not restricted to the embodiments described therein. Unless otherwise indicated all parts and percentages are by weight.

EXAMPLE 1

Preparation of petroleum resin by thermal polymerization of cyclopentadiene

A solution of cylopentadiene (700 g) in benzene (300 g) was heated to 260°C in 2.5 hours in an autoclave and thereafter the reaction mixture was kept at 260°C for another 2.5 hours at autogenous pressure. After cooling, benzene and low-boiling compounds were removed by distilling the reaction mixture at 20 mm Hg and the temperature increased from 100° to 170°C. The residue obtained was 650 g of light-brown resin with a melting point of 94°C and an iodine number of 8.8 mgeq. of iodine/g of resin.

EXAMPLE 2 (Comparative)

Preparation of a test ink (Methyl) cyclopentadiene resin (200 g) with a melting point of 123°C and obtained by thermal polymerization of a distillate fraction containing cyclopentadiene, methyl cyclopentadiene and dimers of (methyl)

cyclopentadiene from a steam-cracking installation was distilled at atmospheric pressure and a temperature of 225°–260°C in a nitrogen atmosphere. After 260 g of distillate had been discharged, the resin was heated at 260°C for 3 more hours. The residue so produced was a resin with a melting point of 142°C. A 50 % solution of the resin in toluene had a viscosity of 38 cP at 20°C.

A test ink was prepared by mixing toluene (50 g) with Grasolechtrood (0.6 g, manufactured by Geigy) and with a quantity of resin such that the ink has a viscosity of 100 cP. Grasolechtrood is a commercially available product characterized by the manufacturer as metallized pigment complex. The ink was applied to paper (quality 78 grams/m²) in a layer 30 μ thick by means of a wire applicator. The drying time at room temperature was determined by periodically cutting two strips from the printed paper and pressing these strips together with the printed sides for 5 minutes in a press with a force of 40–50 kg/cm². If the printed surfaces showed damage the ink layer was not sufficiently dry. The drying time was taken to be the time after which the surface of the strips showed no more damage after being pressed together. A good ink must have a drying time of 15 minutes or less. The ink in question had a drying time of over 25 minutes.

The rubbing resistance of the dried ink layer was determined by rubbing the paper in one place with degreased and dry fingers in strokes of about 15 cm in one direction, until ink remained on the fingers and the gloss of the printed surface decreased. The rubbing resistance of the test ink was 4 strokes. The same procedure was repeated for preparing test inks in the following examples differing, of course, on the particular resin employed. The drying time and rubbing resistance tests were conducted in the same manner.

EXAMPLE 3

(Methyl) cyclopentadiene resin (2000 g) with a melting point of 80°C was heated to 240°C in a nitrogen atmosphere in a flask provided with a reflux cooler. At this temperature the resin was refluxed; then the refluxing strongly decreased after 8 hours, while the temperature rose to 260°C. The melting point of the resin rose to 170°C. Then tall-oil fatty acid (200 g) and magnesium oxide (6g) were carefully added. A sample of the mixture in a 50 % solution of toluene had a viscosity of 40 cP. The mixture was heated at 265°C for 3 more hours and then cooled, poured onto a metal plate and ground after solidificaton. The final product was a clear hard resin with a melting point of 150°C, a viscosity of 186 cP in a 50 % solution of toluene, and was infinitely soluble in toluene and soluble in a mixture of toluene and 80/110 boiling range gasoline in a ratio of 1 : 1 : 1.5. A test ink was then prepared as in Example 2 using the modified petroleum resin thus prepared. The ink was applied as in the comparative example and similarly tested. The test ink prepared with this resin had a drying time of 2–3 minutes and a rubbing resistance of 6 strokes.

For the sake of comparison, the above procedure was repeated except without magnesium oxide. Again an ink was prepared with this resin, was tested and found to have a drying time of 15 minutes and a rubbing resistance of 5 strokes.

EXAMPLE 4

(Methyl) cyclopentadiene resin (2000 g) with a melting point of 115°C was melted and mixed with oleic acid (280 g) and zinc oxide (12 g) in a flask. The mixture was heated at 265°–275°C with reflux for 6.5 hours in a nitrogen atmosphere. The resin thus obtained had a melting point of 138°C and a viscosity in a 50 % solution of toluene of 115 cP. A printing ink prepared with this resin as in Example 2 had a drying time of 6–7 minutes and a rubbing resistance of 7 strokes, when measured according to the procedures of Example 2.

EXAMPLE 5

(Methyl) cyclopentadiene resin (1000 g) with a melting point of 170°C was melted and mixed with tall-oil fatty acid (300 g) magnesium oxide (7 g), and magnesium oleate (2.5 g) in a flask. The mixture was heated at 250°C under reflux for 4.5 hours in a nitrogen atmosphere. In this way a resin with a melting point of 125°C and a viscosity in a 50 % solution of toluene of 112 cP was obtained, which was fairly compatible with chlorinated rubber (Pergute S 20 manufactured by Farbenfabriken Bayer). A test ink prepared with this resin as in Example 2 had a drying time of 4–5 minutes and a rubbing resistance of 6–7 strokes.

EXAMPLE 6

(Methyl) cyclopentadiene resin with a melting point of 80°C was refluxed at 240°–260°C for 8 hours and produced a resin with a melting point of 174°C. Tall-oil fatty acid (170 g) and colophony (30 g) were carefully added to 2000 g of this resin at 260°C, when the temperature fell to 250°C. Then zinc oxide (6 g) was added and the mixture was kept at 250°C for another two hours. The resulting resin had a viscosity in a 50 % solution of toluene of 215 cP and a melting point of 160°C, was infinitely soluble in toluene, and was readily miscible with chlorinated rubber. An ink prepared with this resin in the manner of Example 2 had a drying time of 3 minutes and a rubbing resistance of 8 strokes.

EXAMPLE 7

A resin was prepared from (methyl) cyclopentadiene resin (2000 g), tall-oil fatty acid (210 g) resin acid (40 g), and magnesium oxide (6 g) in the manner described in example 6. The modification reaction was continued until the resulting resin had a viscosity in a 50 % solution of toluene of 186 cP and a melting point of 148°C. The resin was readily miscible with chlorinated rubber and could be processed into an ink as in Example 2 with a drying time of 2 minutes and a rubbing resistance of 7 strokes.

EXAMPLE 8

The preparation of resin of Example 7 was repeated, but with 330 g of tall-oil fatty acid containing 15 % of resin acids and with 7 g of magnesium oxide. The resin obtained had a melting point of 145°C, a viscosity in a 50 % solution of toluene of 163 cP and was well miscible with chlorinated rubber. A printing ink prepared with this resin as in Example 2 had a drying time of 2 minutes and a rubbing resistance of 7–8 strokes.

EXAMPLE 9

(Methyl) cyclopentadiene resin (2500 g) with a melting point of 100°C was melted and mixed with tall-oil fatty acid (385 g), phenol (250 g) and magnesium oxide (8.8 g) in a flask at a temperature of 125°C. The temperature was then gradually raised to 240°C after which the mixture was refluxed at 240°–260°C for another 6 hours. In this way a resin with a melting point of 146°C and a viscosity in a 50 % solution of toluene of 230 cP was obtained, which was soluble in toluene and mixtures of toluene and 80/110 boiling-range gasoline, and was compatible with both chlorinated rubber and modified phenol resin (Alsynol RL-30 type of modified phenol resin manufactured by N.V. Chemische Fabriek Synres of Hoek van Holland, the Netherlands, is a condensation product of phenol and formaldehyde modified with colophony).

When the experiment was repeated in the presence of 100 g of phenol, the resin obtained had virtually the same properties, but was lighter in color.

EXAMPLE 10

A mixture of (methyl) cyclopentadiene resin (2000 g) with a melting point of 115°C and phenol (40 g) was kept at a temperature of 220°–230°C with reflux for 6 hours, after which 180 cc of liquid were distilled off at 260°C and atmospheric pressure. To this a mixture of tall-oil fatty acid (150 g), resin acid (50 g) and magnesium oxide (3 g) was then carefully added. The reaction mixture was maintained at 260°C for another 8 hours. The clear odorless resin obtained in this way had a melting point of 120°C and a viscosity in a 50 % solution of toluene of 120 cP, and was excellently miscible with chlorinated rubber and modified phenol resin. An ink prepared with this resin as in Example 2 had a drying time of 4–5 minutes and a rubbing resistance of 7 strokes.

EXAMPLE 11

A mixture of (methyl) cyclopentadiene resin (2000 g) tall-oil fatty acid (225 g) and of resin acids (100 g) was heated in an inert atmosphere. When the temperature reached 160°C, zinc oxide (3 g) and octyl phenol (1700 g) were added which lowered the temperature to 125°C. At this temperature paraform (312 g) was added in small quantities over a period of 1 hour. Subsequently the temperature was raised to 240°C in 4 hours, when 30 cc of water were distilled off. It was striking that there was no other reflux. In this way a resin with a melting point of 127° and a viscosity in a 50 % solution of toluene of 60 cP was obtained, which was completely soluble in toluene, fairly soluble in gasoline with a boiling range of 80°–110°C and was fairly compatible with chlorinated rubber. The resin could be processed into an ink as in Example 2 with a drying time of 5 minutes and a rubbing resistance of 10 strokes.

EXAMPLE 12

(Methyl) cyclopentadiene resin (850 g) with a melting point of 110°C was melted and mixed with tall-oil fatty acid (225 g), zinc oxide (6 g) and phenol (235 g) in a flask. At a temperature of 125°C paraform (117 g) was then added in a period of 1.5 hours, after which the mixture was raised to 250°C in 2 hours. The mixture was allowed to react at this temperature for another 1.5 hours. Apart from some water that was discharged as a distillate, there was hardly any reflux.

The clear odorless resin obtained from the above had a melting point of 144°C, a good solubility in toluene and mixtures of toluene and 80/110 boiling-range gasoline, a viscosity in a 50 % solution of toluene of 227 cP, and a good compatibility with chlorinated rubber and modified phenol resin. The resin could be processed into an ink as in Example 2 with a drying time of 5–8 minutes and a rubbing resistance of 8–10 strokes.

EXAMPLE 13

The experiment of Example 12 was repeated, but this time 25.5 g of acrylic acid and 25.5 g of butylacrylate were first added to the petroleum resin, after which the other reagents were added in the same quantities. The resin thus obtained had substantially the same properties, but the ink based on this resin produced a more evenly coloured surface when applied in a very thin layer.

EXAMPLE 14

To a mixture of 160 g of tall-oil fatty acid, 65 g of soybean-oil fatty acid, 100 g of resin acids and 3 g of magnesium-oxide, heated at 120°C in a nitrogen atmosphere, were added 470 g of phenol. Then 234 g of paraformaldehyde were slowly added over a period of 1 hour. In the course of 1.5 hours the temperature was gradually increased to 200°C. Then 2000 g of (methyl) cyclopentadiene resin and 2 g of magnesium oxide were added, after which the mixture was kept at 250°C for 4 hours. The resulting resin had a light color, a melting point of 140°–150°C and a viscosity of 120 cP in a 50 % solution of toluene.

The resin smelled of hydrocarbon after 2 months storage in a closed drum. When the experiment was repeated, this time with addition of 7 g styrene right after the addition of the paraformaldehyde, a resin having substantially the same properties was obtained, but which did not give off any appreciable smell even after 4 months storage.

I claim:

1. In a process for the preparation of a modified petroleum resin comprising mixing and reacting together, at a temperature of about 150° C. to about 320° C:
   a. a weakly unsaturated petroleum resin, and
   b. from about 5 to about 50% by weight, calculated on the amount of resin component (a), at least one unsaturated fatty acid having from 12–30 carbon atoms, the improvement comprising using a weakly unsaturated petroleum resin composed essentially of polymerized units of cyclopentadiene, methyl cyclopentadiene or both and obtained by thermal polymerization of essentailly cyclopentadiene, methylcyclopentadiene or dimers thereof, having a melting point between 70° C. and 200° C. and a bromine number, expressed as grams of bromine per 100 grams of resin, of less than 150, and conducting the reacting in the presence of from about 0.05 to about 5% by weight, calculated on the amount of resin component (a), of metal compound soluble in the reaction mixture and substantially free from forming strongly colored products in combination with components (a) and (b), the metal selected from the group consisting of magnesium, aluminum and zinc, and continuing the reaction until a resin product having a melting point of at least 125° C. is obtained.

2. The process according to claim 1 wherein the petroleum resin (a) has a melting point between 140°C and 180°C.

3. The process according to claim 1 wherein the petroleum resin of (a) has a bromine number of 30–75.

4. The process according to claim 1 wherein the process is conducted at a temperature of about 240°C to about 275°C.

5. The process according to claim 1 wherein the amount of fatty acid component (b) is 10–30 % by weight.

6. The process according to claim 1 wherein the fatty acid component (b) is tall-oil fatty acid.

7. The process according to claim 1 wherein the fatty acid component (b) is selected from the group consisting of oleic acid, linolenic acid, linoleic acid, palmitoleic acid, elaidic acid, ricinoleic acid, petroselic acid, arachidonic acid, cetoleic acid and mixtures thereof.

8. The process according to claim 1 wherein the amount of the metal compound is from 0.1 to 1.0 % by weight.

9. The process according to claim 1 wherein the metal is magnesium.

10. The process according to claim 1 wherein the metal compound is selected from the group consisting of zinc oxide, zinc oleate, aluminum oleate, aluminum oxide, magnesium oxide, magnesium stearate and magnesium oleate.

11. The process according to claim 1 wherein the reaction is conducted in the absence of oxygen.

12. The process according to claim 1 wherein the reaction is continued until a resin product having a melting point of 140°–160°C is obtained.

13. A process according to claim 1 in which the reaction is carried out in the presence of an olefinically unsaturated aromatic hydrocarbon in a proportion of from 1 to 6 % by weight based on the said petroleum resin.

14. A process according to claim 1 in which the reaction is carried out in the presence of a mixture of acrylic acid or methacrylic acid and an alkylester of acrylic acid or of methacrylic acid or of a copolymer derived from such monomers, in a proportion of from 1 to 10 % by weight based on the said petroleum resin.

15. The process according to claim 1 wherein there is further included in the reaction mixture from 5–100 % by weight, calculated on the amount of resin component (a), a phenol-formaldehyde resin having an aldehyde to phenol ratio between 1 : 1 and 2 : 1.

16. The process according to claim 15 wherein the phenol-formaldehyde resin is formed in situ under the reaction conditions.

17. The process according to claim 15 wherein the amount of said phenol-formaldehyde resin is from 15–45 % by weight.

18. The process according to claim 15 wherein the process is conducted at a temperature of about 225°C to about 275°C.

19. The process according to claim 1 wherein there is further included in the reaction mixture from 1–25 % by weight, calculated on the amount of resin component (a) a substituted or unsubstituted phenol having from 7–16 carbon atoms.

20. The process according to claim 19 wherein the amount of said phenol is from 4–10 % by weight.

21. The process according to claim 19 wherein the process is conducted at a temperature of about 225°C to about 275°C.

22. The process according to claim 1 wherein there is further included in the reaction mixture from 0.5 to 20 % by weight, calculated on the amount of resin component (a), at least one resin acid selected from the group consisting of abietic acid, neo abietic acid laevopimaric acid and mixtures thereof.

23. The process according to claim 22 wherein the amount of resin acid is from 1.5–5 % by weight.

24. The process according to claim 22 wherein the process is conducted at a temperature of about 240°C to about 275°C.

25. In a process for the preparation of a modified petroleum resin comprising mixing and reacting together, at a temperature of about 260°C to about 275°C:
   a. a weakly unsaturated petroleum resin, and
   b. from about 5 to about 50% by weight, calculated on the amount of resin component (a), at least one unsaturated fatty acid having from 12–30 carbon atoms; the improvement comprising using a weakly unsaturated petroleum resin composed essentially of polymeric units of cyclopentadiene, methyl cyclopentadiene or both and obtained by thermal polymerization of essentially cyclopentadiene, methyl cyclopentadiene or dimers thereof, having a melting point between 70°C and 120°C and a bromine number, expressed as grams of bromine per 100 grams of resin, of less than 120, and conducting the reaction in the presence of from about 0.05 to about 5% by weight, calculated on the amount of resin component (a), of metal compound soluble in the reaction mixture and substantially free from forming strongly colored products in combination with components (a) and (b), the metal selected from the group consisting of magnesium, aluminum and zinc, and continuing the reaction until a resin product having a melting point of at least 125°C. is obtained.

26. In a process for the preparation of a modified petroleum resin comprising heating at a temperature of about 240°C to about 290°C:
   a. a weakly unsaturated petroleum resin with
   b. from about 5 to about 50% by weight, calculated on the amount of resin component (a), at least one unsaturated fatty acid having from 12–30 carbon atoms; the improvement comprising using a weakly unsaturated petroleum resin composed essentially of polymeric units of cyclopentadiene, methyl cyclopentadiene or both and obtained by thermal polymerization of essentially cyclopentadiene, methyl cyclopentadiene or dimers thereof, having a low melting point and a bromine number, expressed as grams of bromine per 100 grams of resin, of less than 120 and heating the resin until a resin product having a higher melting point of 140°–180°C is produced, and thereafter mixing and reacting resin component (a) at a temperature of about 240°C to about 260° and conducting the reaction in the presence of from about 0.05 to about 5% by weight, calculated on the amount of resin component (a), of metal compound soluble in the reaction mixture and substantially free from forming strongly colored products in combination with components (a) and (b), the metal selected from the group consisting of magnesium, aluminum and zinc, and continuing the reaction until a resin product having a melting point of from 140°–160°C is obtained.

27. A modified resin consisting substantially of units derived from cyclopentadiene, methyl cyclopentadiene or their mixture produced by the process of claim 1.

28. The process according to claim 1 wherein the metal compound is an oxide of said metal or a carboxylic salt of said metal.

* * * * *